RADIO RELAY REPEATER

Filed Sept. 2, 1964 4 Sheets-Sheet 1

INVENTORS
PHINEAS J. ICENBICE, JR.
LOREN E. CURRISTON
ROBERT F. HOLLAND
BY [signature]
ATTORNEY
John B. Miller, Jr.
AGENT

RADIO RELAY REPEATER

Filed Sept. 2, 1964 4 Sheets-Sheet 2

INVENTORS
PHINEAS J. ICENBICE, JR.
LOREN E. CURRISTON
ROBERT F. HOLLAND
BY [signature]
ATTORNEY
John B. Miller, Jr.
AGENT

RADIO RELAY REPEATER

Filed Sept. 2, 1964 4 Sheets-Sheet 3

INVENTORS
PHINEAS J. ICENBICE, JR.
LOREN E. CURRISTON
ROBERT F. HOLLAND
BY
ATTORNEY
John B. Miller, Jr.
AGENT

RADIO RELAY REPEATER

Filed Sept. 2, 1964 4 Sheets-Sheet 4

INVENTORS
PHINEAS J. ICENBICE, JR.
LOREN E. CURRISTON
ROBERT F. HOLLAND
BY
ATTORNEY
John B. Miller, Jr.
AGENT United States Patent Office 3,288,402

Patented Nov. 29, 1966

3,288,402
RADIO RELAY REPEATER

Phineas J. Icenbice, Jr., and Loren E. Curriston, Los Angeles, and Robert F. Holland, Ventura, Calif., assignors to Litton Systems, Inc., Beverly Hills, Calif.

Filed Sept. 2, 1964, Ser. No. 393,925
16 Claims. (Cl. 244—138)

The present invention relates to an air-droppable, radio relay repeater and, more particularly, to an easily deployed, light-weight, radio relay system that extends effective range of portable communications equipments, especially those being used in a mountainous or heavily-wooded environment.

Key considerations in the design of a portable communication system are its size and weight and the efficiency of its operation. Compact, light-weight communication systems are usually designed to operate with low transmitter output power in the VHF (very high frequency) band of frequencies. For example, existing portable field communication equipment, such as the "handy-talkie" and "walkie-talkie" radio sets, normally operate at power output levels of less than 1.0 watt and at frequencies above 20 megacycles. Such portable systems are designed to operate at VHF frequencies because over ranges of less than one hundred miles such frequencies provide more consistent, interference-free communication than do the lower frequencies. VHF frequencies are affected to a lesser extent by varying atmospheric conditions than are lower frequencies. This is particularly true in portable systems where physically short antennas must be employed. Normally, the sacrifice of transmitter output power in such equipment is of no great consequence, though it does limit communication to stations within line-of-sight of one another, since limited range is normally all that is required of the portable system.

Consider, however, the numerious problems encountered when such high frequency, low-powered equipment is used in mountainous, heavily-wooded, or jungle terrain. The radio waves are reflected and absorbed by the mountainous terrain, are considerably attenuated by the tree foliage, and are restricted and absorbed by tropical rain forests and dense jungles. Since the signals are initially of quite low power, minimal attenuation eliminates their effectiveness. It is well known that it is extremely difficult to establish communication between a station beneath the tree foliage (jungle canopy) and a base station. This is true even if such stations would be in line-of-sight of one another were it not for the dense jungle canopy. A transmitter having an antenna below moist tree foliage is relatively ineffective because the foliage absorbs (in proportion to its thickness) the induction and radiation field energy of a signal emitted by the antenna.

Since jungle canopies and mountains are generally quite high, it is extremely difficult to raise an antenna above the canopy to establish an effective communication link between the portable station and the base station. Accordingly, it is an object of the present invention to provide a radio relay repeater that may be used with existing communication equipment in mountainous and heavily-wooded areas to extend the effective range of such communication equipment over and around mountains and through jungle canopy.

It is another object of the present invention to improve communication between a base station and ground-based personnel in a moutainous, heavily-wooded or jungle environment.

A further object of the present invention is to provide a compact radio relay repeater that may be deployed at the top of a jungle canopy to extend the effective range of portable communication equipment.

To this end, the present invention provides a compact, light-weight, easily deployed radio relay system that may be carried by and dropped from an aricraft, and which, when dropped, slowly descends to lodge itself above the interfering elements, e.g., either in the top of a jungle canopy or on the mountain top. More particularly, according to one embodiment of the present invention, the radio relay apparatus is packaged within a uniquely-mechanized, helicopter-type container specially adapted for the controlled safe delivery of an electronic relay apparatus from an aircraft or other elevated position to a desired location at the treetops of the jungle canopy or at a determined ground level.

The location for deployment of the radio relay repeater of the present invention is selected so that the relay apparatus may be positioned within the effective range of the portable station and within line-of-sight of the base station. As will be considered hereinafter for purposes of example, if the portable station is located beneath a jungle canopy and is unable to transmit messages to the base station, the radio relay repeater of the present invention is dropped on the top of the jungle canopy near the portable station. From this treetop location, the repeater may receive the radio messages from the portable station and automatically transmit them above and beyond the obstructions to the base station. The base station, usually housing a transmitter having a much higher output power (at least 10 times greater than the output power of the portable station), receives the relayed message and transmits the return message directly to the portable station.

So that the radio relay repeater may be employed as described above, it is desirable to have the repeater enclosed within a simply mechanized, expendable, and droppable container having some means attached thereto for slowing the container's rate of descent. Special attention must also be given to the problems of preventing damage to the electronics during descent and upon landing, and of providing an aerodynamic retarding or braking mechanism which is little affected by wind currents that otherwise would tend to drive the descending container off course. Moreover, the means used to retard the descent of the radio repeater (depending upon the location of deployment of the invention) may have to serve as a support for the repeater in the treetops of a jungle canopy.

Since conventional parachutes obviously cannot be employed because of their tendency to drift off course with wind currents, attention is directed to what is known in the art as an aerial device which employs a rotary blade parachute (Rotochute). Rotochutes incorporate a plurality of blades which are adapted to rotate and provide lift as the device falls through the air, thus slowing the rate of descent. The prior art Rotochutes, however, have certain disadvantages that render them inadequate for use in the present invention. Among these disadvantages are the lack of mechanisms for regulating the rotor blade pitch and speed of rotation. The few devices which have such mechanisms are extremely complex and use cumbrous schemes for hinging the rotor blades to the container and governing their rotational speed. The failure to provide pitch and rotational speed-regulating mechanisms permits a container to attain a high initial drop velocity that is difficult to reduce before impact and allows the blades to reach excessively-high rotational speeds which may damage the Rotochute or its contents of internal equipment through the high centrifugal forces developed.

The rotor blades of Rotochutes often revolve at speeds greater than 1000 revolutions per minute. Because of the relative delicacy of the electronic equipment of the invention to be housed in the container, the container may not be permitted to rotate at any appreciable rate, during which rotation the electronics could be damaged by centrifugal forces. The prior art Rotochutes do not provide any means for isolating the rotation of the blades from the container or do not provide apparatus for counter-acting the thrust bearing torques, if such a means of isolation is provided.

It is yet another object of the present invention to provide a simply-mechanized container in which the radio relay repeater may be dropped which is not affected by wind currents which tend to drive the container from its preselected course.

Another object of the present invention is to provide a uniquely-constructed Rotochute having rotor blades whose angles of attack are substantially self-regulated to impart aerodynamic stability to the Rotochute.

As mentioned above, the air-droppable container must also be able to support the radio repeater in the treetops of a jungle canopy. The rotating blades of the Rotochute, therefore, should be connected to the package in such a manner that, upon first contact with the tree foliage they cease to rotate and lodge the repeater in the treetop. The Rotochutes of the prior art, however, are not constructed to have these features. Rather, upon impact with the tree foliage, the blades of prior art Rotochutes would either continue to rotate (tending to cut through the foliage) or would fold against the container and permit the container to penetrate the jungle canopy. In such an event, the radio repeater housed within the container would not be able to transmit to the base station through the jungle canopy.

It is therefore another object of the invention to provide a container having rotating blades which may function to lodge it in the uppermost portions of a jungle canopy.

In order that the radio relay repeater of the present invention may be deployed effectively in a mountainous, heavily-wooded, jungle, or marsh terrain, a unique, simply-mechanized, air-droppable container is employed to house the electronics of the invention. The container for the relay repeater of the invention achieves the desired objectives and obviates the disadvantages of prior art aerial devices by employing two sets of counter-rotating flexible blades of a unique, generally-helical design, one set of blades above the other. Each set of blades is hinged in a simple manner to a uniquely-constructed hub assembly that is coupled to the top of a canister which contains a transmitter and receiver (transceiver) and a power supply. When the blades are extended, the flexibility and hinging arrangement of the helical blades of the invention impart aerodynamic stability to the container. Moreover, the hinging is accomplished in such a manner that the blades are also able to fold and wrap around the canister for providing a compact package that may be readily stored.

As the radio relay repeater is launched, by dropping it from an aircraft or other elevated position, each rotor blade is urged from its folded position to its extended position by a coil spring attached thereto. Air striking the under-surfaces of the blades causes the blades to open to their fully extended position immediately after the repeater is dropped. As will be explained hereinafter, it is important that the blades reach a high initial speed as soon as possible so that an immediate lift can be produced to slow the descent of the repeater package. As the blades move away from the canister, a pressure-actuated micro-switch is released by one of the blades, enabling the power supply to activate the transceiver of the relay repeater.

The relay repeater descends from the drop location to the treetops of the jungle canopy, where the lower set of rotating blades comes in contact with the foliage and is forced up to collide with the top set of rotating blades, thereby causing both sets of blades to cease rotating. Because the blades are fairly flexible, they tend to readily wrap themselves around the branches of the trees into which the repeater has been dropped. The blades make electrical as well as mechanical contact with the moist foliage of the jungle canopy for acting as a ground plane for an antenna mounted on top of the canister. Additionally, in one embodiment of the invention, upon impact with the jungle foliage, a weight, previously-restrained within the lower end of the canister, is released therefrom. The weight pulls an antenna wire out of the canister and down through the tree foliage. With the antenna wire extended, the radio relay repeater of the present invention is ready for the reception of radio signals from a portable station beneath the jungle canopy and the transmission of those signals above and beyond the jungle canopy to the base station.

As mentioned, in the embodiment of the invention described, the radio signals received from the portable station are at a VHF frequency. The signals are received at this VHF frequency by the radio receiver (part of the transceiver) within the canister, amplified, and converted to a higher frequency. The higher frepuency signal is amplified by successive stages of tuned radio-frequency (RF) amplifiers and applied to the top-mounted antenna for transmission to the base station.

A still further object of the present invention is to provide an air-droppable radio relay repeater that may be employed for path finding or location-marking functions.

Another object of the present invention is to provide a radio relay repeater that may be safely and effectively dropped from an aircraft.

The novel features which are believed to be characteristic of the present invention, both as to its organization and method of operation, together with further objects and advantages thereof, will be better understood from the following description considered in connection with the accompanying drawings in which one embodiment of the present invention is illustrated by way of example. It is to be expressly understood, however, that the drawings are for the purpose of illustration and description only and are not intended as a definition of the limits of the invention.

In the drawings:

FIGURE 1 is a partially cross-sectional plan view of one embodiment of an air-droppable radio relay repeater constructed according to teachings of the present invention, wherein the container is illustrated with its rotor blades in a fully extended position;

FIGURE 1*a* is a cross-sectional view along line 1(*a*)—1(*a*) of FIGURE 1 of a gravity force-actuated antenna release mechanism employed in the embodiment of the present invention illustrated in FIGURE 1;

Figures 1, 1A, 3:
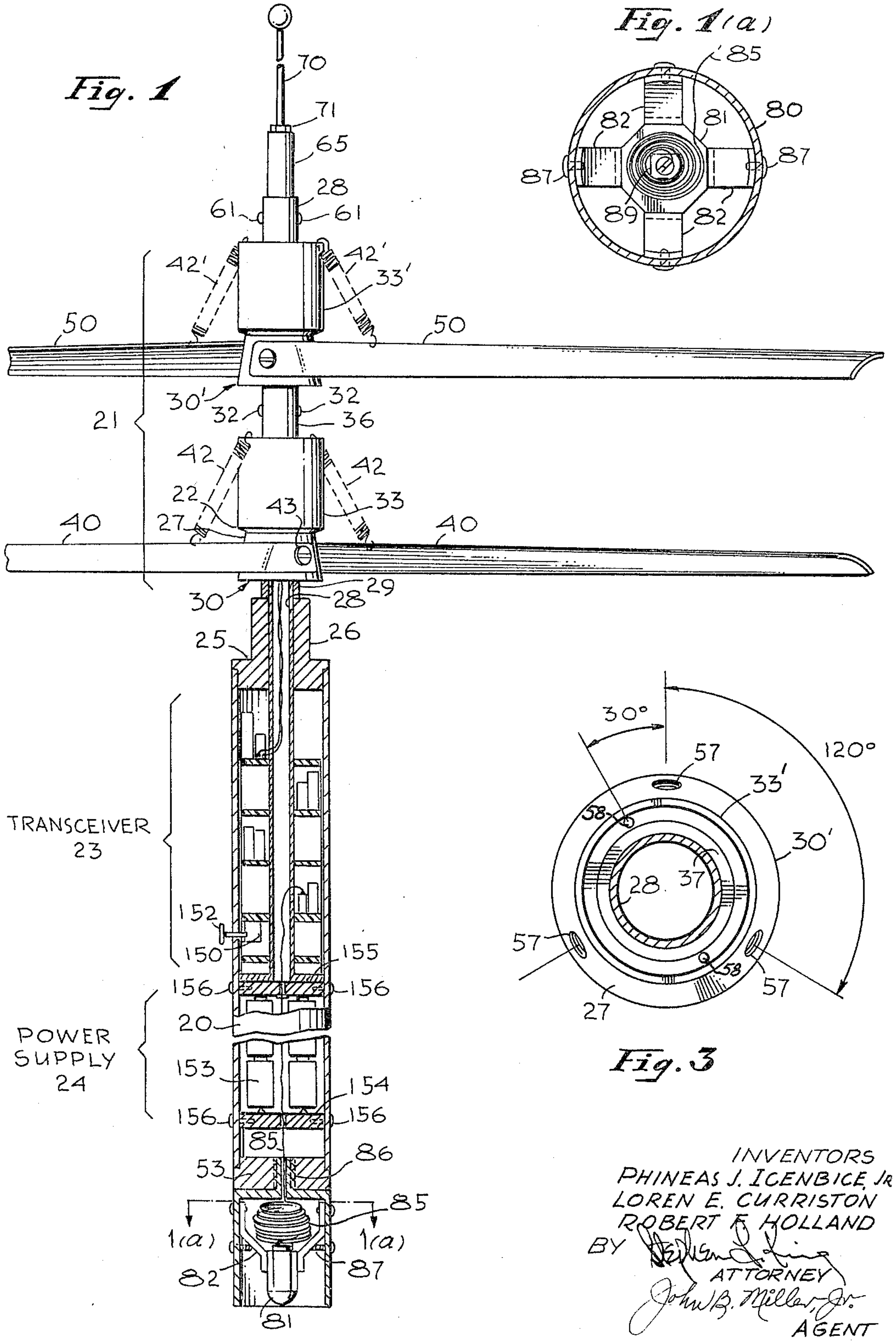
FIGURE 3 is a top view along line 3—3 of FIGURE 2 of a hub member of the rotor assemblies illustrated in FIGURE 2.
Figure 8:
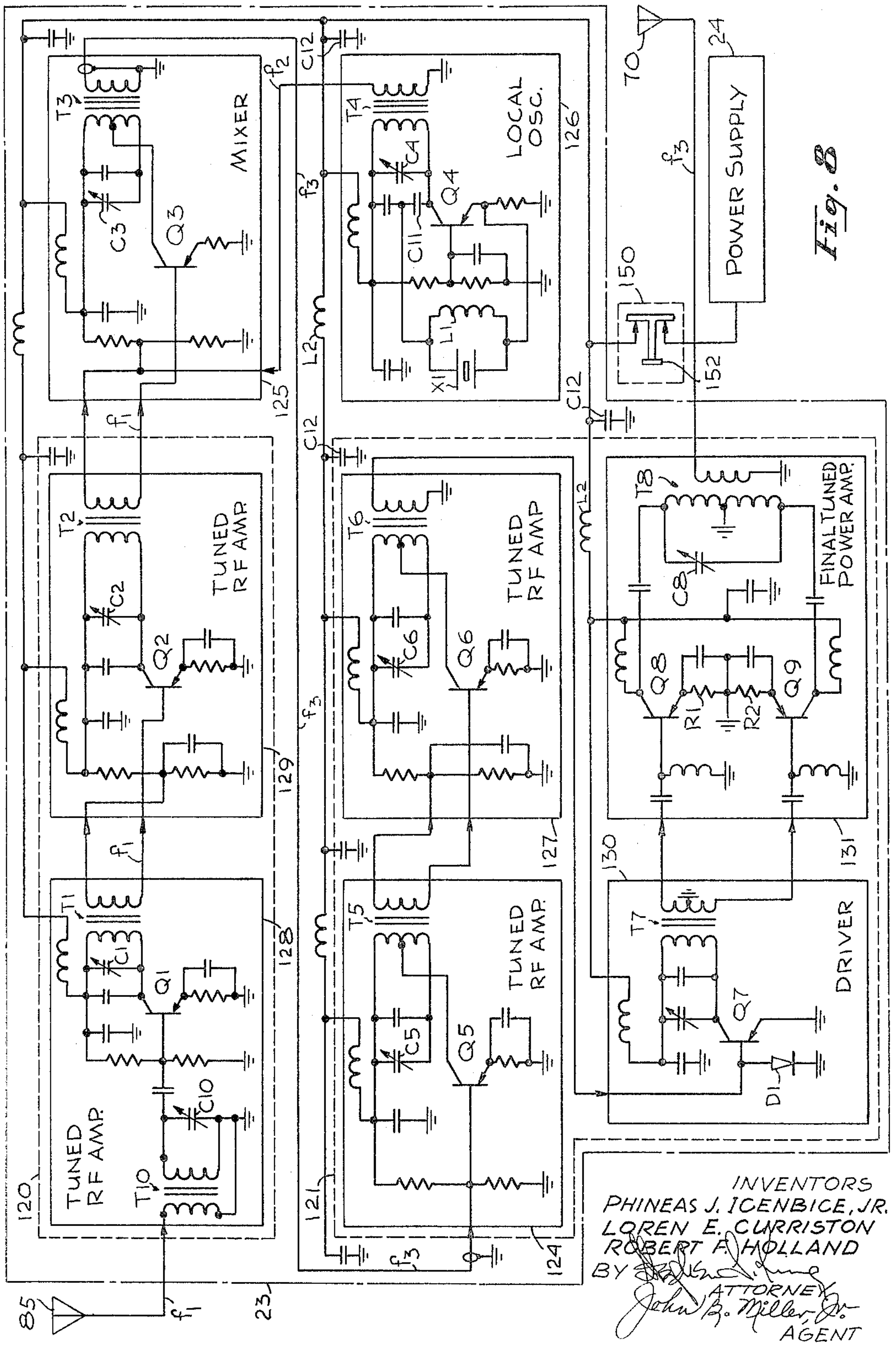
Figure 9:
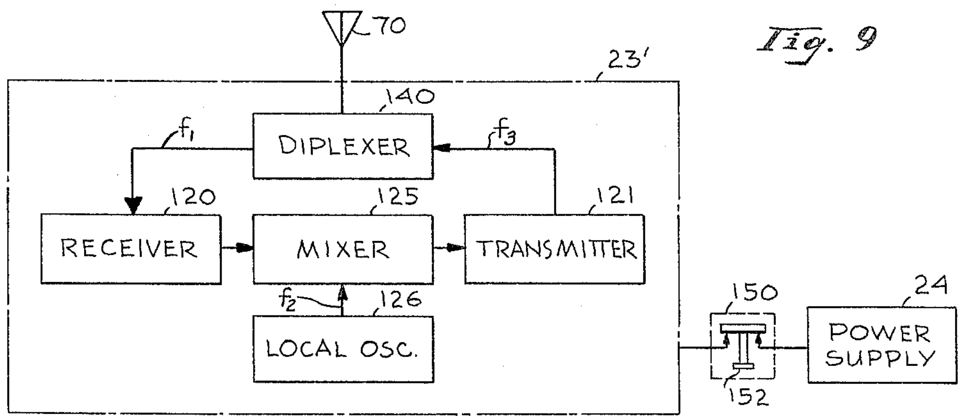
Figure 10:
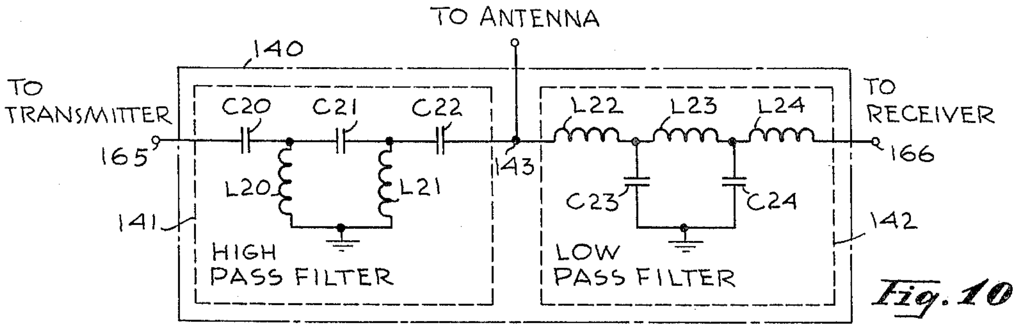
Figure 11:
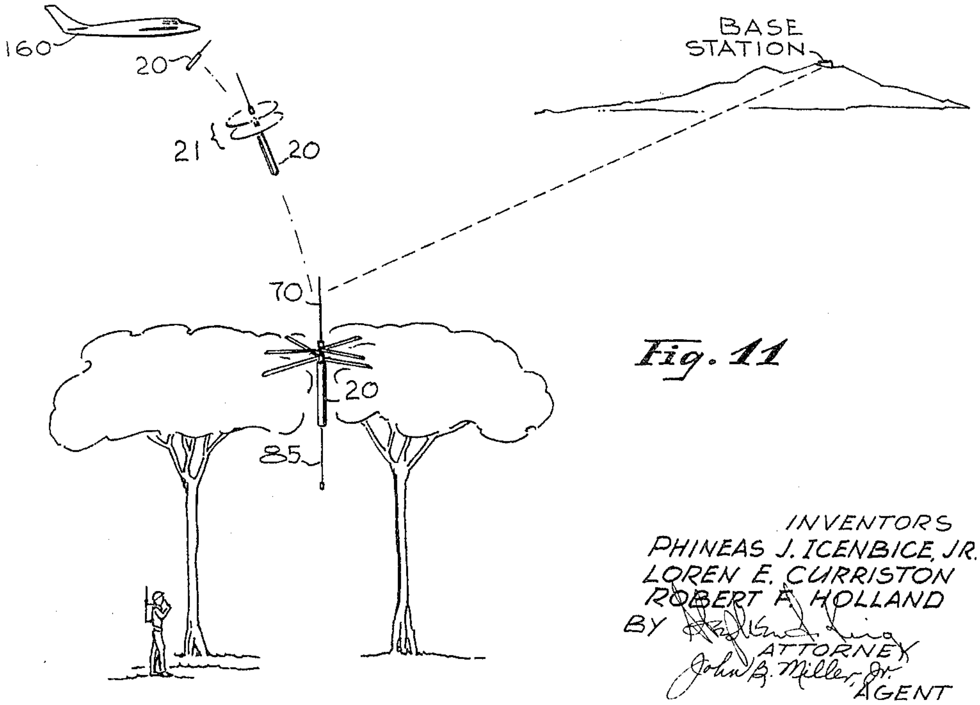

FIGURE 8 is a circuit diagram of one embodiment of transceiver that may be employed in the present invention;

FIGURE 9 is a block diagram of a second embodiment of transceiver that may be employed in the present invention;

FIGURE 10 schematically illustrates one type of diplexer circuit that may be employed in the transceiver shown in FIGURE 10; and FIGURE 11 illustrates the sequence of events during deployment and operation of the radio relay repeater of the present invention, as illustrated in FIGURE 1, in a jungle or heavily-wooded environment.

Figure 2:
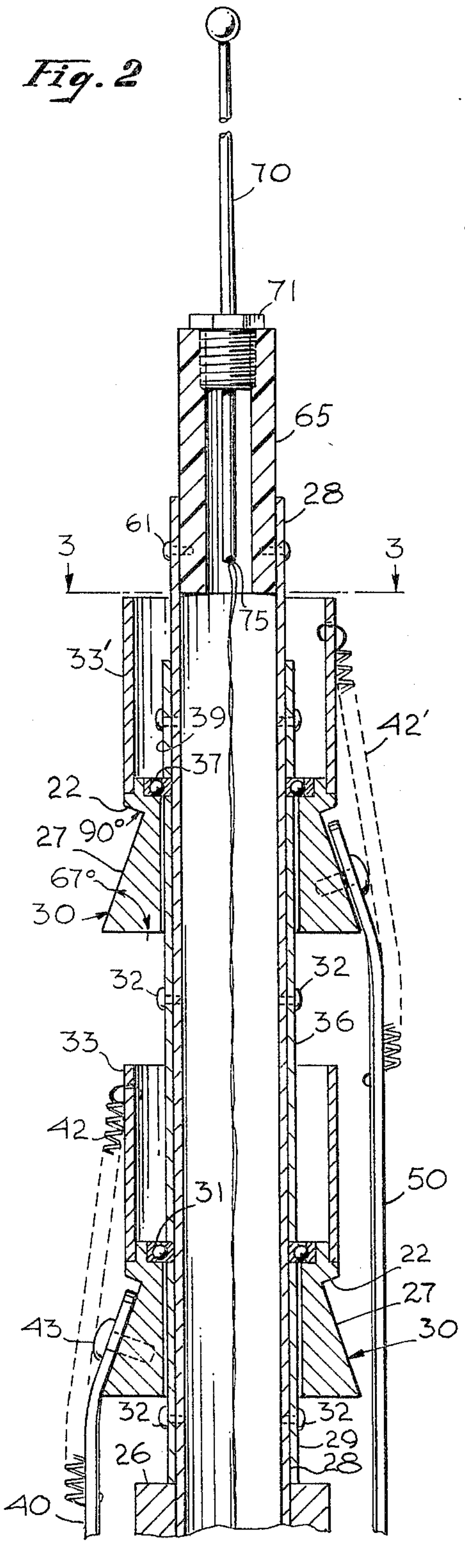
FIGURE 2 is a cross-sectional view of the rotor blade assemblies and one antenna assembly of the relay repeater of the present invention, wherein the repeater is illustrated with the rotor blades in a folded position.

Referring now to the drawings and, more particularly, to FIGURES 1 and 2, there are shown cross-sectional views of an air-droppable radio relay repeater mechanized in accordance with teachings of the present invention to include a canister 20 (that may be cylindrical in shape, as shown) on top of which is positioned a rotary blade braking mechanism 21 and an antenna 70. Within the cylindrical canister 20 is positioned a transceiver 23 (combined transmitter and receiver), generally filling the top half of the canister 20. Directly beneath the transceiver 23 in the canister 20 is positioned a power supply 24 that stores the amount of electrical energy required to operate the transceiver 23, when activated.

Moreover, the canister 20 provides a base for the rotary blade braking mechanism 21, which comprises a pair of counter-rotating blade assemblies which rotate around a shaft 28. The shaft 28 is rigidly attached to and extends upward from a support neck 26 of a baseplate 25 that has been fastened to the top of the canister 20. It may be seen that each of the rotor assemblies includes a hub (a lower hub 30 and an upper hub 30') which rotates about the shaft 28 on an internally-contained bearing race that moves around the top of a bearing seat. A bearing seat 29 is attached around the shaft 28 and may be seen to extend below the hub 30 of the lower rotor assembly.

With reference to the lower rotor assembly shown in FIGURE 1, it will be noticed that to the hub 30 are attached three generally helically-shaped rotor blades 40. Each blade 40 is connected to the hub 30 by means of a bolt 43. The blades 40 are in a horizontally extended and operable position, that is, a position substantially at right angles to the shaft 28. As will be described hereinafter with reference to FIGURE 2, the blades are raised to this extended position from a folded position, where the longitudinal axis of each blade 40 is substantially parallel to the shaft 28 and the blade is contiguous with the outside surface of the canister 20. To assist the movement of the blades 40 from the folded position to the extended position, three coil springs 42 respectively interconnect the three rotor blades 40 on one end to a spring-anchor collar 33 on the other end. The spring-anchor collar 33 is mounted on top of the hub 30 and extends thereabove concentric with the shaft 28.

As may be seen in FIGURES 1 and 2, above the anchor collar 33 there extends an upper bearing collar 36 that is riveted to the shaft 28 by means of the rivets 32. It should be noted that in the embodiment of the invention described herein, the upper bearing collar 36 for the lower rotor assembly has been extended upward to provide a bearing seat for the bearing within the hub 30' in the upper rotor assembly.

Considering the upper rotor assembly, it will be immediately noticed that it is substantially identical to the lower rotor assembly, the only difference being the fact that the three rotor blades 50 of the upper assembly are pitched oppositely from the pitch direction of the corresponding rotor blades 40 in the lower rotor assembly. The blades 50 are attached to the hub 30', on top of which is mounted an anchor collar 33'.

Referring now to the antenna 70 and the means by which it is mechanically connected to the container, it will be noticed in FIGURES 1 and 2 that within the end of the shaft 28 is positioned an insulator 65 that is secured to the shaft by means of a pair of screws 61. The screws 61 pass through the sides of the tube 28 and into threaded holes in the insulator 65. The insulator may be constructed of a number of suitable materials such as nylon or phenolic. It is of hollow cylindrical shape so that a wire may pass therethrough for electrical connection to the antenna 70. The antenna 70 is firmly held within the insulator 65 by means of a coupling nut 71 that threads into a hole in the top of the insulator 65. The coupling nut 71 is welded, or in some other efficient manner attached, to the end of the antenna 70.

On the left side of the canister 20, as illustrated in FIGURE 1, extending outward from the transceiver 23 is a plunger 152 of a micro-switch 150. As will be explained in greater detail hereinafter, when the rotor blades 40 and 50 are in the folded position, they are contiguous with the outside surface of the canister 20. In this position, at least one of said blades comes in contact with the plunger 152 of the micro-switch 150 and applies sufficient pressure thereto to hold the plunger (which is spring-loaded outward) inward in its disengaged position, thereby preventing the power supply 24 from making electrical contact with the transceiver 23. When the blades raise to their extended position, the plunger 152 is released and allowed to move outward, thereby engaging the switch and supplying electrical energy from the power supply 24 to the transceiver 23 for activating the latter.

With regard to the mechanization of the power supply 24, as illustrated in FIGURE 1, the power supply has been simply constructed, employing therein a plurality of conventional C-size, 1.5 volt flashlight batteries 153 or industrial type cells of the same size and shape. The exact number of cells required is dependent upon the power requirement of the transceiver 23, which power requirement in the embodiment described is very low because of the transistorized construction. The batteries 153 in each row are connected in series, and each row of serially-connected batteries is connected in parallel with the other rows for providing the required power. To provide mechanical and electrical contact with the negative and positive terminals of the batteries, a pair of contact boards 154 and 155, respectively, are employed and held in position within the canister 20 by means of the screws 156.

The embodiment of the invention described herein and illustrated in FIGURE 1 employs two antenna systems. One antenna (the antenna 70 described above) is used as a transmitting antenna to complete the communication link above the jungle canopy; while a second antenna 85, housed within a container 80 at the lower end of the canister 20, may be used as a receiving antenna for establishing a communication link with ground-based personnel who may desire to utilize the capabilities of the radio relay repeater. More particularly, the lower antenna 85 comprises a wire which is coiled within the container 80 and may be pulled therefrom and extended by a droppable weight 81. The wire of antenna 85 may be insulated so as not to ground to the moist foliage of the jungle canopy. The container 80 is coupled by means of a threaded shaft 86 to a baseplate 53 within the lower end of the canister 20. One end of antenna wire 85 is electrically and mechanically connected to the transceiver 23, while the other is mechanically connected by an insulating clamp 89 to the weight 81. The weight 81 is restrained within the container 80 by means of a plurality of biasing members 82. The position of each of the biasing members 82 may be adjusted by a thumb screw 87 so that the compression forces on the sides of the weight 81 are of such a magnitude that, under normal conditions, the weight 81 is restrained within the container 80 and holds the coiled antenna wire 85 therein.

However, with reference to FIGURES 1 and 1*a*, it will be noticed that by adjustment of the set of bias-trimming screws 87, the force with which the weight 81 is held in position may be adjusted to a measurable value. The amount of force is chosen such that, when the radio relay repeater makes contact with the top of the jungle canopy and high G-forces are applied to the weight 81, the weight will drop from the container 80 through the trees, pulling the antenna wire 85 with it.

Referring to FIGURE 2, it will be noticed that the rotor assemblies of the braking mechanism 21 and the upper antenna assembly have been cross-sectioned to better illustrate their construction. More particularly, as described above, the hub 30 rotates about the shaft 28 on a bearing race 31, which rides on the bearing seat 29. Again, it will be noticed that the bearing collar 36 secures the bearing 31 and lower hub 30 in place and also provides a bearing seat for an upper rotor-hub bearing race 37. The upper rotor-hub bearing 37 is held in place by means of an upper bearing collar 39. The bearing seats and collars are affixed to the shaft 28 by means of rivets 32.

The invention as illustrated in FIGURE 2 is shown as having the blades 40 (of the lower rotor assembly) and the blades 50 (of the upper rotor assembly) in their folded position, that is, in a position such that the longitudinal axes of the blades are substantially parallel to the shaft 28 and the blades are contiguous with the outside surface of the canister 20. In this position, the springs 42 and 42′ are in tension and are tending to pull the blades upward. The blades are held in this folded position by means of a strap, string, or any other simple retaining measure that will hold the blades against the canister until the relay repeater is to be dropped for use.

Referring with particularity to the mechanization of the rotor hubs 30 and 30′, the complex geometry of the hub design (and, as will be more fully described hereinafter, the rotor blade design) provides a uniquely-simple blade hinging and supporting mechanism. Attention is directed to the upper rotor hub 30′, where it will be noticed that the lower part of the hub 30′ is similar in shape to a truncated cone having a base angle of 67°. The blade 50 is mounted to the hub 30′ on a conical surface 27, which is the largest circumferential surface of the hub. One surface of a stop 22 extends at a right angle from the conical surface 27 at the cone's plane of truncation, the stop 22 being a machined or cast integral part of the hub 30′. Within a circumferential slot around the top outer edge of the stop 22 is secured the spring-anchor collar 33′. At a lesser radial distance from the center of the hub than the circumferential slot is positioned the bearing race 37.

A top view of the hub 30′ is shown in FIGURE 3, wherein it may be seen that three drilled and tapped holes 57 are equally spaced 120° from one another circumaxially about the conical surface 27. Additionally, a pair of drilled and tapped holes 58 may be seen to be positioned in the top surface of the blade stop 22, wherein screws may be located for holding the bearing race 37 in place. The holes 58 are aligned on a diameter of the hub 30′, the diameter being 30° displaced from a center line of one of the holes 57.

Figure 4:
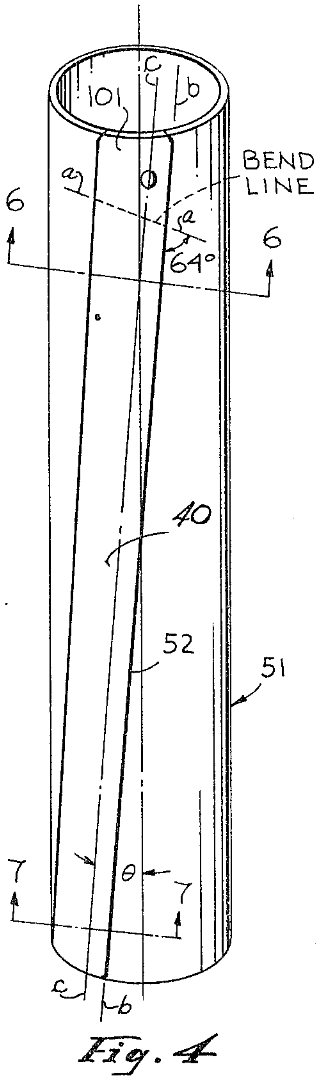
FIGURE 4 is a perspective view of a rotor blade of the radio repeater of the invention illustrating the blade as it may be cut from a tubular piece of material.

Referring now to FIGURES 4 through 7 and, more particularly FIGURE 4 thereof, construction of the generally helically-shaped rotor blades employed in the braking mechanism 21 may be facilitated by cutting the blades from a tubular piece of material (for example, aluminum). More particularly, in FIGURE 4 a cylindrical tube 51 is shown on which there is outlined one of the blades 40 having its longitudinal axis *c—c* oriented at an angle $\theta$ from the longitudinal axis of the cylinder. FIGURE 4 illustrates a perspective view of the cylindrical tube 51 showing the blade 40 as it wraps around the tube. It is obvious from FIGURE 4, therefore, the manner by which the curvature and helical shape are given to the blade by the quasi-helical cutting of the blade 40 from the tube 51.

Figure 5:
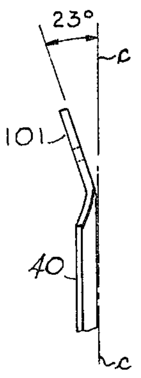
FIGURE 5 is an auxiliary view of the rotor blade illustrated in FIGURE 4 projected from a bend line, this figure illustrating the degree of tab-bend necessary so that the rotor blade will mate with the hub member illustrated in FIGURE 3.

In order that the blade 40 properly mate with the hub 30 in both the folded position and the extended position of the blade, it has been determined that a tab-end 101 of the blade 40 (shown in FIGURE 4) should be bent along a line *a—a* angularly positioned 64° from a leading edge *b—b* of the blade 40. As shown in FIGURE 5, the amount of bend of the tab-end 101 from the longitudinal axis *c—c* of the blade 40 has been determined to be approximately 23°. The tab-end 101 of the blade 40 (approximately ¾ inch in length) is attached to the hub 30, whereby the longitudinal axis *c—c* of the helically-shaped rotor blade may be substantially parallel to the canister 20 in one position (the folded position) and substantially perpendicular to the canister 20 in the second position (the extended position).

Figure 7:
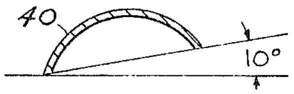
FIGURE 7 is a cross-sectional view along line 7—7 of FIGURE 4 of the rotor blade shown in FIGURE 4 illustrating a low degree of blade pitch near the tip of the rotor blade.
Figure 6:
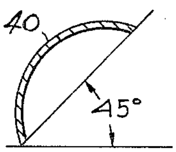
FIGURE 6 is a cross-sectional view along line 6—6 of FIGURE 4 of the rotor blade shown in FIGURE 4 illustrating a high degree of blade pitch near a hub connection of the rotor blade.

Moreover, the combined geometries of the rotor blade 40 and hub 30 enable each rotor blade to move independently and seek its own coning angle with respect to the plane of rotation of the blades, thereby allowing the angle of attack of each blade to vary in accordance with the wind conditions in the locale where the repeater is dropped. In this regard, it is obvious that the tip-end of a blade during rotation is traveling at a faster rate than is the tab-end 101 of the same blade. So that the total area of the blade will provide lift from the tab-end 101 out to the tip-end, even though the rotational speed of each incremental area of the blade is different, each rotor blade employed in the present invention is constructed to have a built-in pitch difference between the tab-end 101 and the tip-end. Referring to FIGURES 6 and 7, in FIGURE 6 there is shown a cross-section of the blade 40 at a plane near the tab-end 101. Near the tab-end 101 the pitch of the blade 40 is approximately 45°; whereas in FIGURE 7 (which illustrates a cross-section of the blade at the tip-end) the pitch of the blade is shown to be approximately 10°. The change in pitch between the tab-end 101 and the tip-end of the blade 40 is due to the length of the blade and the choice of the orienting angle $\theta$. The angle $\theta$, providing uniform pitch variation from 45° to 10° over the length of a 28 inch blade cut from a tube 2.5 inches in diameter has been determined to be approximately 2°.

Referring again to the aerodynamic effects of the blade and hub construction, the stop 22 of the hub 30′ provides an upper limit to the upward extension of the blades, both during rotation and while the blades are supporting the repeater in the jungle canopy. The angle of departure of the stop 22 from the conical surface 27 (90°) has been chosen so that the rotating blades may readily seek their natural included coning angle of about 164°. In other words, each blade rotates in a position raised about 8° above the horizontal. The coning angle results from a balance between the aerodynamic lift forces tending to move the blades upwardly and inwardly and centrifugal forces tending to move the blades outwardly and downwardly. This balance of forces prevents the blades from being bent by the force of the air moving past them. An included coning angle of about 164°, for the length of the rotor blades employed in the embodiment of the invention described (approximately 28 inches), enables the repeater to descend at a typical rate of 35 feet per second.

By constructing the blades in the manner described and by pivotally coupling them to the conical surface 27 of the hub 30′, the rotor blades tend to be relatively insensitive to the cross-winds which would move the repeater off course. More specifically, it is desired that the repeater of the present invention descend in a ballistic course from the point of drop to the desired point of impact. Assume that the repeater is descending on course in a vertical direction and is suddenly subjected to a cross-wind. If the blades of each rotor assembly were rigidly attached to the hub, the cross-wind would tilt the repeater and cause the plane of rotation of the rotor blades to be angularly off-set from the horizontal. The blades, like a sail, would carry the repeater from its ballistic course.

However, it will be recalled that the blades of the rotor assemblies employed in the present invention are not rigidly attached, but are pivotally connected to the conical surface 27 of the hubs by means of the bolts 43. Thus, considering for the moment only the action of one rotor blade, when a cross-wind tends to tilt the repeater, the angle of attack of the rotor blade is changed and so also is the relationship between centrifugal forces and lift forces on that blade. The relationship being changed, the blade tends to seek a new coning angle angle so as to balance these forces. The change in coning angle reduces the blade surface exposed to the cross-wind on which the cross-wind can act, and the repeater tends to remain on its descent course.

While the blades (as illustrated, for example, in FIGURES 4 through 7) are shown to be semicircular in shape, in reality each blade should be a true airfoil. Nevertheless, in order to provide a simple, low-cost, and easy to manufacture blade, the sacrifice of a true airfoil may be made with a minimum loss of blade effectiveness.

It will be appreciated, however, that two rotor assemblies should be employed in the present invention, one rotor assembly to counteract the thrust bearing torques of the second rotor assembly on the canister 20. The drag torque of one rotor on the shaft 28 is off-set by the oppositely-directed torque of the other rotor. In this manner, the canister 20 will rotate at only a very low speed (due to small differences in torque), while the rotors may spin at several thousand revolutions per minute. Theoretically, if the bearing torque of the two rotor assemblies on the shaft 28 could be matched exactly, the canister 20 would not rotate. Nevertheless, such reduction in the rotation of the canister 20 as is provided may sufficiently eliminate the detrimental effects of centrifugal forces on the electronic components of the transceiver 23 within the canister.

Referring now to FIGURE 8, there is schematically illustrated one type of transceiver 23 that may be employed in the present invention for receiving a message transmitted below the jungle canopy and relaying that message to a base station. More particularly, the transceiver 23, illustrated in FIGURE 8, is shown to include a receiver 120 that accepts a radio frequency (RF) signal of a first frequency $f_1$ from an antenna 85 and amplifies the accepted RF signal to a level suitable for use.

The suitability of a particular type of receiver to a specific application of the present invention is measured by its ability to meet the performance requirements, that is, sensitivity, gain, noise figure, and so forth. The receiver chosen for the embodiment of the invention illustrated in FIGURE 8 is a tuned radio frequency (TRF) receiver. A TRF receiver is one in which the received RF signal is amplified to a relatively high level by tuned amplifiers resonant at the frequency of the received signal. As is well known in the art, the number of amplifying stages in the receiver is proportional to the required gain and selectivity; the illustrated receiver 120 employs two amplifying stages, the tuned RF amplifiers 128 and 129. It will be noted, however, in the TRF receiver employed, the received RF signal is not demodulated. Rather, the frequency of the received and amplified RF signal is shifted by heterodyne action in a mixer circuit 125 to a second frequency $f_3$.

By the term "heterodyne" is meant to mix two alternating current signals of different frequencies in a nonlinear device for the purpose of producing a signal of a new frequency ($f_3$) corresponding to the sum of or difference between the two original frequencies. In this regard, the mixer circuit 125 is responsive to the application of the amplified RF signal at frequency $f_1$ and an output signal (at a frequency $f_2$) of a local oscillator circuit 126. The output signal of the local oscillator is modulated by the RF signal in the mixer circuit 125 to produce signals having modulation frequencies which are the sum and difference of the frequencies $f_1$ and $f_2$. Signals are also produced at the frequencies $f_1$ and $f_2$ and at the sum and difference frequencies of the RF signal and the harmonics of the local oscillator signal. However, one of the signals produced ($f_3$) is selected, by properly tuning the output circuit of the mixer 125 (as will be hereinafter explained in greater detail), to be the output signal of the mixer 125.

At this point in the transceiver 23, the received RF signal of frequency $f_1$ has been amplified by the reciver 120 and has been translated in frequency to the new frequency $f_3$, which will be considered hereinafter as the sum of frequencies $f_1$ and $f_2$. The output signal of the mixer 125 is applied to a transmitter 121 (shown to include two tuned RF amplifiers 124 and 127, a driver stage 130 and a final tuned power amplifier 131) which further amplifies the mixer output signal and transmits the signal from the antenna 70 to the base station.

Referring with particularity to the mechanization of the receiver 120 and the transmitter 121 of the transceiver 23, as illustrated in FIGURE 8, it is apparent that the tuned RF amplifiers 128 and 129 of the receiver 120 are substantially identical in form, both amplifiers being common-emitter arrangements. In this regard, the amplifier 128 is shown to include a PNP transistor Q1 into the base electrode of which is injected the received radio signal of frequency $f_1$. The received signal is picked up by the antenna 85 which is connected to the primary winding of a transformer T10. The primary winding of the transformer T10 is connected between the antenna 85 and ground and the secondary winding of which is connected in parallel with a capacitor C10 to form a tuned circuit. The amplifier 128 including the transistor Q1, in response to the applied radio signal of frequency $f_1$, amplifies the $f_1$ signal and transfers the amplified $f_1$ signal to the amplifier 129 through a transformer T1. It should be noted that the primary winding of the transformer T1 is connected in parallel with a variable capacitor C1, the parallel combination being the tank circuit for the amplifier 128 and being tuned to pass the frequency $f_1$. The secondary winding of the transformer T1 introduces the $f_1$ signal to the amplifier 129. In this regard the $f_1$ signal is injected to the base electrode of a PNP transistor Q2 of the amplifier 129. The amplifier 129 again increases the magnitude of the received radio signal of frequency $f_1$ by the application of this signal to the base electrode of the transistor Q2 and the development of a high voltage drop across the P–N junction between the collector and base electrodes. To the transformer T2, therefore, whose primary winding is connected in parallel with the capacitors C2 and forms a tuned tank circuit therewith, is applied the further amplified radio signal of frequency $f_1$. As in amplifier 128, the tank circuit produced by the primary winding of the transformer T2 and the capacitor C2 is tuned to the frequency $f_1$ such that only said frequency passes through the transformer T2.

The local oscillator 126, on the other hand, as illustrated in FIGURE 8 is shown to be a modified Colpitts-type crystal oscillator which employs the parallel mode of resonance of a crystal X1 connected in parallel with an inductor L1. The crystal is used in the oscillator circuit because of its extremely high Q (narrow bandwith) and good frequency stability over a given temperature range. Feedback is supplied from the collector of a PNP transistor Q4 through a capacitor C11 and the tuned crystal-inductor combination to the emitter electrode of the transistor Q4. The crystal X1 and the inductor L1 are tuned to a frequency $f_2$, which is the desired output frequency of the local oscillator 126. Additionally, in the local oscillator 126 the primary winding of a transformer T4 is connected in parallel with a variable capacitor C4 and the value of these two elements is adjusted so as to be tuned to the frequency $f_2$. In this manner, the output frequency of the oscillator 126 may be precisely controlled. It should be pointed out that the oscillating frequency of this circuit is determined not only by the crystal X1, but also by the parallel inductance offered by the inductor L1.

The mixer circuit 125 is responsive to the application of the output signal of the local oscillator 126 at the frequency $f_2$ and the amplified $f_1$ signal from the amplifier 129. In this regard, the signal of frequency $f_2$ is introduced in series with the output signal of the tuned RF amplifier 129. This is accomplished by connecting the local oscillator 126 to the mixer 125 so that the $f_2$ signal is coupled through the secondary winding of the transformer T2 of the amplifier 129 to the base electrode of a PNP transistor Q3 together with the $f_1$ signal emanating from or through the primary winding of the transformer T2 into the base electrode of the transistor Q3 of the mixer 125.

Within the mixer 125, as stated above, the radio frequency $f_1$ is heterodyned with the oscillator frequency $f_2$ in the transistor Q3. The heterodyning action of the transistor Q3 is accomplished by operating the transistor on the curved portion of its dynamic transfer characteristic curve. Under these conditions, when the two frequencies $f_1$ and $f_2$ are applied to the base electrode of the transistor Q3, four major frequencies are produced at the collector output terminal of the transistor Q3. Two of the output frequencies are the original frequencies that were present in the base input. Another one of the frequencies present in the output signal is a frequency that is equal to the sum of the original two frequencies. The remaining frequency that is present in the output signal of the transistor Q3 is a frequency that is equal to the difference between the two original frequencies.

In the embodiment of the transceiver 23 described herein, it has been assumed that the frequency equal to the sum of the two original frequencies is the one of interest, and all other frequencies must be filtered out. The filtering action is accomplished by means of the tuned circuit in the collector circuit of the mixer 125, the tuned circuit being formed by the primary winding of a transformer T3 connected in parallel with a capacitor C3. By properly adjusting the values of these two components, the circuit may be made resonant at a frequency $f_3$, which is greater than the frequency $f_1$ of the received RF signal by an amount equal to the frequency $f_2$ of the oscillator output signal. It is the selected output signal of the mixer circuit 125 of frequency $f_3$ that is coupled through the transformer T3, and measurable between one terminal of the secondary winding of the transformer T3 and ground. The selector mixer output signal $f_3$ is applied to the transmitter 121 for re-transmission.

The selected mixer output signal of frequency $f_3$ is applied to the transmitter 121 at the base electrode of a PNP transistor Q5 of the tuned RF amplifier 124. It may be recognized that the operation of the amplifiers 124 and 127 is substantially the same as the operation of the amplifiers 128 and 129 of the receiver 120. In this regard, the tank circuit of the amplifier 124 (formed by the primary winding of a transformer T5 connected in parallel with a capacitor C5) in the collector circuit of the transistor Q5 is tuned to pass only the signal of frequency $f_3$ on to the amplifier 127. The amplifier 127 employs a similar tuned tank circuit connected to the collector electrode of a PNP transistor Q6. After further amplification, the signal of frequency $f_3$ is transferred from the transistor Q6 collector electrode to the center-tap of the primary winding of a transformer $T_6$. The primary winding of the transformer T6 and a capacitor C6, connected in parallel with said primary winding, are tuned to pass only the signal of frequency $f_3$ to the secondary winding of the transformer T6. The secondary winding is connected to the driver circuit 130.

As will be described hereafter, the final tuned power amplifier 131 employed in the embodiment of the transceiver 23, illustrated in FIGURE 8, was selected to be a Class B, push-pull amplifier. As is well known in the communication art, therefore, such a Class B amplifier must be preceded in the circuit by a driver stage, which is capable of supplying high output power at the required peak frequency voltage. The input circuits of the Class B-operated transistors represent a variable load resistance over the frequency cycle because as a signal is applied the base current does not increase in direct proportion with the base voltage. To prevent distortion, therefore, it is necessary to have a driving source that will maintain the waveform of the signal without distortion even though the load impedance on the driving source varies. To this end, it should be capable of delivering somewhat more power than is consumed in the pair of Class B-operated transistors.

Accordingly, the driver circuit 130 precedes the final tuned amplifier 131 in the circuit of the transceiver 23, illustrated in FIGURE 8. It may be seen that the base electrode of a PNP transistor Q7 of the driver circuit 130 is clamped to ground potential through a diode D1. The diode D1 is provided to preclude the coincident occurrence of excessive emitter-collector voltage and a reversed biased base-emitter circuit which could generate destructive internal oscillations. This condition can occur in unprotected transistor amplifiers used as the driver circuits when transformers are used in the output circuit. If the signal from the previous stage is suddenly terminated or if too strong noise signals drive the base-emitter circuit into a reverse bias condition, the collector current is rapidly cut off. The field surrounding the primary winding of the output transformer collapses rapidly and produces high emitter-collector voltage, while the base-emitter circuit is reverse biased. This condition causes strong oscillations which dissipate power in the transistor and can destroy it. To forestall the possible occurrence of this condition, the junction diode D1 is connected between the base and the emitter (which is connected to ground) to prevent the base-emitter circuit from reverse biasing. The action of the diode D1 is referred to as shunt-limiting action.

The remainder of the driver circuit 130 operates substantially as have the other tuned RF amplifiers of the transceiver 23 in that the tank circuit (formed by the primary winding of the transformer T7 connected in parallel with a variable capacitor C7) is tuned to pass only signals of the frequency $f_3$ via the secondary winding of the transformer T7 to the final tuned power amplifier 131.

As stated above a Class B push-pull amplifier is employed as the final tuned power amplifier 131. The push-pull power amplifier 131 employs two similar type PNP transistors Q8 and Q9. The base-emitter bias for the transistors Q8 and Q9 is provided by the resistors R1 and R2, respectively, which interconnect the emitter electrode of each transistor and ground. A signal from driver circuit 130 of frequency $f_3$ is applied to the base electrodes of the transistors Q8 and Q9 by the secondary winding of the transformer T7. The signals are derived at opposite ends of the secondary winding so have opposite phases. In response to these two applied 180° phase-opposite signals, the transistor Q8 and the transistor Q9 conduct on alternate half cycles of the input signal. The output signal of the final tuned power amplifier is combined in the secondary winding of an output transformer T8. The primary winding of the transformer T8 is connected in parallel with a capacitor C8 to form a tank circuit, which is again tuned to the frequency $f_3$ so that the output signal in the secondary winding of the transformer T8 has a frequency of $f_3$. As may be seen from FIGURE 8, it is the output signal of the final tuned power amplifier 131 which is applied to the antenna 70 for transmission to the base station.

In one specific illustrative embodiment, the foregoing non-linear circuit elements may take the following illustrative values:

*Table 1*

| | |
|---|---|
| Q1, Q2, Q3, Q4, Q5, Q6 | Transistor No. 2N700. |
| Q7, Q8, Q9 | Transistor No. 2N1692. |
| D1 | Fairchild Semiconductor Corp. diode No. FD200. |

The power requirements of the transceiver 23 are satisfied by a power supply 24, illustrated in FIGURE 8 as being connected to the transceiver 23 through a normally-closed push-button switch 150. In this regard, from the discussion hereinabove of the mechanics of the repeater, it will be recalled that the switch 150 has a plunger 152 which comes in contact with the blades 40 and 50. The blades in their folded position depress the plunger 152, thereby opening the switch and ceasing current drain from the supply 24 to the transceiver 23. When the blades are raised to their extended position, pressure on the plunger 152 is released. The switch 150 moves to its normally-closed position, and the power supply 24 begins to deliver electric energy to the transceiver 23.

It will be noticed that a number of line filter combinations, comprising capacitors C12 and inductors L2, have been included in the connecting circuits between the power supply 24 and the various stages of the transceiver 23. It is the purpose of these line filters to eliminate inter-stage coupling of the various frequency signals through the power lines. The operation of the filters employed is identical to the operation of standard line filters known in the art.

Because of the transistorized construction of the transceiver 23, as hereinabove described, thereby eliminating the requirement that the power supply 24 constantly supply the filaments of electron tubes, it is obvious that the operating life of the repeater (as determined by the effective life of the power supply) may be extended to weeks or months depending upon the use of the repeater during that time. Accordingly, the transceiver 23 and its power supply 24, as illustrated in FIGURE 8, may operate unattended for a considerable time on the top of a jungle canopy to establish a communication link between a remotely deployed field unit and a base station.

Referring now to FIGURE 9, there is shown in block diagram form an alternate embodiment of the transceiver 23 that may be employed in the repeater of the present invention. In this regard, it will be noted that a transceiver 23' is substantially the same as the transceiver 23 illustrated in FIGURE 8 except for the fact that the transceiver 23' of FIGURE 9 is shown to include a diplexer circuit 140. The diplexer circuit 140 is a coupling system between the transmitter 121 and the antenna 70 and the receiver 120 and the antenna 70, which enables the receiver 120 and the transmitter 121 to operate simultaneously from the same antenna 70. Accordingly, the antenna 85, previously illustrated in FIGURE 8 as being connected to the receiver 120, has been eliminated from the system.

The alternate embodiment of the transceiver 23' may be employed when the radio repeater of the invention is to be used in the manner described above or for path-finding operations. In such a deployment, the remote transmitter would transmit its message to the radio repeater, which would receive the signal (of frequency $f_1$) on the antenna 70. The received signal of frequency $f_1$ to the receiver 120 as previously discussed. The receiver 120 would amplify the applied RF signal and, in turn, apply the amplified RF signal of frequency $f_1$ to the mixer circuit 125, in order that this signal may be modulated by the output signal of the local oscillator 126 and shifted to a frequency $f_3$. The transmitter 121, upon application of the signal of frequency $f_3$ thereto, would increase the power level of the modulated signal of frequency $f_3$ and apply it to the diplexer circuit 140. The diplexer circuit 140, in response to the signal of frequency $f_3$, would route this signal to the antenna 70 for radiation thereby, rather than to the receiver 120. Accordingly, a method of simultaneously employing the antenna 70 as both a transmitting and receiving antenna is provided by the circuit illustrated in block diagram form in FIGURE 9.

It should be noted that the circuit operation of the transmitter 121 and the receiver 120 is the same as described with reference to FIGURE 8. However it is obvious that the diplexer circuit 140 is the key circuit for operating the transceiver 23' as illustrated in FIGURE 9, in the manner described. One form of diplexer circuit 140 that may be employed in the transceiver 23' is shown in FIGURE 10 to include, basically, a high pass filter 141 and a low pass filter 142. A low pass filter is a filter that transmits alternating current signals below a given cut-off frequency and substantially attenuates all other signals; while the high pass filter is one that transmits all frequencies above a given cut-off frequency and substantially attenuates all others.

A properly designed low-pass filter has the property of passing without substantial power loss, all frequencies below its "cut-off" frequency; but, simultaneously, such a filter has large attenuation for all frequencies above the cut-off frequency. As previously described with reference to FIGURE 8, the receiver is designed to receive lower frequency signals than the transmitter is designed to transmit. In this manner, the low-pass filter 142 will allow passage therethrough to the receiver 120 all low frequency signals, while the high-pass filter 141 will allow passage therethrough from the transmitter 121 all high frequency signals. Accordingly, one terminal of each of the filters is connected to a common terminal 143 to which the antenna 70 is connected. To the terminal 165 of the high-pass filter 141 is connected the transmitter 121; to the terminal 166 of the low-pass filter 142 is connected the receiver 120.

A received signal of frequency $f_1$, having a lower frequency than a signal of frequency $f_3$ to be transmitted, is passed from the antenna to the terminal 143. At this point the high-pass filter 141 (only passing high frequencies) rejects the received low frequency signal. The received low frequency signal passes through the low-pass filter 142 to the receiver terminal 166. The received signal having been mixed with the local oscillator signal to form a signal of higher frequency than the received signal is applied to the transmitter 121, which transmits the high frequency signal from terminal 165 through the high-pass filter 141. At the terminal 143, because the low-pass filter 142 rejects signals having high frequencies, the low-pass filter 142 does not allow the transmitted signal to pass into the receiver 120, but causes substantially all of the high frequency signal to be routed to the antenna for radiation thereby. These operations of transmitting and receiving may be carried on simultaneously with the same antenna, the high-pass filter 141 and the low-pass filter 142 being able to differentiate between the overlapped A.C. signals.

The selection of component values for the high-pass filter 141 and low-pass filter 142 may be facilitated by employing the formulae described in detail on pages 16–2 through 16–20 of the book entitled "Electronic Designers' Handbook," by Robert W. Landee et al. published in 1957 by the McGraw-Hill Book Company, Inc., of New York, Toronto, and London. Accordingly a further description of the diplexer circuit 140 will not be undertaken herein since it is deemed that the cooperative action between the components is adequately explained in the cited reference. Nevertheless, the components illustrated in FIGURE 10 may, in one illustrative embodiment, have the following illustrative values for a receiving frequency $f_1$ of approximately 30 megacycles and a transmitting frequency $f_3$ of approximately 100 megacycles:

*Table II*

| | | |
|---|---|---|
| L20, L21 | henries | 0.015 |
| C20, C21, C22 | mfd | 80 |
| L22, L23, L24 | henries | 0.072 |
| C23, C24 | mfds | 300 |

It is advantageous now to review the sequence of events during deployment and operation of the invention in a heavily wooded environment. In this regard, reference is made to FIGURE 11, where there is pictorially illustrated a man having a back-pack portable transmitter and receiver for communication between himself and the base station illustrated on a far-off mountain. The man is shown as being in a position beneath a densely-packed jungle canopy, where the tree foliage would normally greatly attenuate the signal emitted by his transmitter.

To circumvent this problem, from an aircraft 160 there is dropped the radio relay repeater of the present invention, whose braking mechanism 21 (the sets of counter-rotating blades) retard the descent (in substantially a vertical direction) of the linear repeater to the treetops of the jungle canopy. Upon impact of the linear repeater with the jungle canopy, the rotor blades cease to rotate and lock into the jungle foliage to maintain the linear repeater on top thereof. The impact causes the weight 81 to pull the receiving antenna 85 from the container 80 down through the jungle canopy. The repeater is now in a position to relay messages transmitted by the man beneath the jungle canopy in the manner described above, from the antenna 70 atop the repeater to the base station. The transmitting power of the base or airborne station is at least 10 times greater than the transmitting power of the back-pack transmitter. The base station, therefore, is able to transmit a reply to the message of the portable station directly from the base station to the back-pack receiver.

It is to be understood that the above-described arrangements are illustrative of the application of the principles of the invention. Numerous other circuits arrangements may be devised by those skilled in the art without departing from the spirit and scope of the invention. Thus by way of example and not of limitation, if the radio repeater of the invention is to be employed as a navigational beacon or drop-zone marker, the radio repeater must be capable of re-transmitting a signal received thereby without phase derogation so that a measurement of the re-transmitted phase wavefront may be accurately made by navigational equipment. Since the oscillator circuit 126, described hereinabove, has a small inherent phase drift, the mixer circuit 125 and the oscillator circuit 126 in the block diagram of the transceiver 23' of FIGURE 9 may be replaced by a frequency multiplier circuit (such as, for example, a harmonic amplifier and a frequency divider circuit, having no inherent phase drift.

In such an embodiment of the present invention, the frequency multiplier circuit would convert the received radio signal of frequency $f_1$ to a signal having a frequency equal to a multiple of the frequency $f_1(Af_1)$. Then, the divider circuit would reduce the signal frequency $(Af_1)$ to the desired output frequency $f_3(f_3=A/Bf_1)$. The frequency $A/Bf_1$ may be chosen to be sufficiently greater than the frequency $f_1$ that the diplexer circuit 140 may readily distinguish between them for purposes of enabling the transmitter 121 and the receiver 120 to operate from the same antenna 70. Accordingly, from the foregoing, it is evident that various changes may be made without departing from the spirit of the invention as defined in the appended claims.

What is claimed as new is:

1. An air-droppable apparatus for extending the effective range of communication equipment, said apparatus comprising:

a container;

communication means for receiving information in the form of a radio signal of a first predetermined frequency and transmitting said information in the form of a radio signal of a second predetermined frequency, said receiving and transmitting means being positioned within said container;

antenna means coupled to said receiving and transmitting means for receiving and radiating radio signals; and a Rotochute for retarding the descent of said container when dropped from an elevated position, said Rotochute including an even number of rotor assemblies for rotation about a central normally vertical axis of said container, each of which rotor assemblies includes a generally conically-shaped hub having a selected base angle and a plurality of helically-shaped rotor blades pivotally connected to the conical surface of said hub and equally spaced circumaxially thereabout.

2. The air-droppable apparatus defined in claim 1, wherein said antenna means includes a first antenna coupled to said communication means for receiving said radio signal of said first frequency and a second antenna coupled to said communication means for radiating said radio signal of said second frequency.

3. The air-droppable apparatus defined in claim 1, which further includes a diplexer circuit intercoupling said antenna means and said communication means.

4. The air-droppable apparatus defined in claim 1, wherein each of said plurality of helically-shaped rotor blades includes a generally helical airfoil member having a substantially straight longitudinal axis, said airfoil member being pivotally coupled to the conical surface of said hub by a tab-end thereof which is positioned tangential to said hub surface, said tab-end of said rotor blade being angularly disposed away from said longitudinal axis by a predetermined angle, where said predetermined angle and said base angle are complementary angles.

5. An aerial device comprising:

a container for carrying a load; and a Rotochute for retarding the descent of said container when dropped from an elevated position, said Rotochute including a predetermined number of rotor assemblies affixed for rotation about an axis of said container, at least one of said number of rotor assemblies being rotatable in a first predetermined direction about said axis and at least one other of said number of rotor assemblies being rotatable in a second predetermined direction about said axis, each of said rotor assemblies including a generally conically-shaped hub having a selected base angle and a plurality of helically-shaped rotor blades pivotally connected to the conical surface of said hub and equally spaced circumaxially thereabout.

6. The aerial device defined in claim 5 wherein each of said plurality of helically-shaped rotor blades includes a generally helical airfoil member having a substantially straight longitudinal axis, said airfoil member being pivotally coupled to the conical surface of said hub by a tab-end thereof which is positioned tangential to said hub surface, said tab-end of said rotor blade being angularly disposed away from said longitudinal axis by a predetermined angle.

7. The aerial device defined in claim 6, wherein said predetermined angle and said base angle are complementary angles.

8. An air-droppable radio relay repeater comprising:

a container;

a transceiver positioned within said container;

antenna means coupled to said transceiver for receiving and radiating radio signals; and means for retarding the descent of said container when dropped from an elevated position, said retarding means comprising at least one rotor assembly including a generally conical-shaped hub having a plurality of helically-shaped rotor blades connected thereto, the rotor assembly being coupled to said container so as to permit rotation of the assembly about an axis of said container.

9. The radio relay repeater defined in claim 8 wherein said hub is generally conical in shape having a selected base angle and said plurality of helically-shaped rotor blades are pivotally connected to the conical surface of said hub, said means for retarding the descent of said container further including means for isolating rotational torques of said rotor assembly from said container to prevent said container from being rotated thereby.

10. An air-droppable radio relay repeater for extending the effective range of communication equipment, said repeater comprising:
 a container;
 a transceiver positioned within said container;
 antenna means coupled to said transceiver for receiving and radiating radio signals; and
 a Rotochute for retarding the descent of said container when dropped from an elevated position, said Rotochute including an even number of rotor assemblies for rotation about a central normally vertical axis of said container and in a predetermined direction, each of which rotor assemblies includes a generally conically-shaped hub and a plurality of helically-shaped rotor blades pivotally connected to the conical surface of said hub equally spaced circumaxially thereabout.

11. Apparatus for extending the effective range of communication equipment, said apparatus comprising:
 a container having means attached thereto for retarding the descent of said container when dropped from an elevated position to a selected location, said means including rotatable means automatically rendering said container relatively unaffected by cross winds tending to cause said container to drift from a course to said selected location; and
 a transmitting and receiving means positioned within said container for receiving information in the form of radio signals of a first frequency and transmitting said information as signals of a second frequency.

12. The apparatus as defined in claim 11, wherein said transmitting and receiving means includes an antenna and a diplexer circuit which intercouples said transmitter and receiver and said antenna for enabling said transmitter and receiver to simultaneously operate from said antenna.

13. A relay repeater comprising:
 a portable transceiver;
 an antenna connected to said transceiver;
 means for causing said transceiver to descend at a rate appreciably slower than that determined by gravity when the transceiver is placed in a free-fall situation; and
 means for lodging said transceiver in the uppermost portions of a jungle-canopy with negligible shock to the components of the transceiver whereby said antenna extends above the top of said jungle-canopy.

14. A communications system comprising:
 means for establishing radio contact between two remote positions;
 means for causing said radio contact establishing means to descend from a vehicle in free-fall at a rate relatively slow with respect to the normal descent required by gravity;
 means for automatically preventing drift of said system in cross-wind currents from a normal ballistic path; and
 means for firmly affixing said system at the upper elevation level of an intended target while maintaining the operational ability of the system.

15. A communications system including a transceiver, said communication system comprising:
 a system of rotating blades for lowering said transceiver from one elevated position to a lower position in free-fall, said system of blades including means for precluding rotation of said transceiver at a rate such as to affect the components of said transceiver detrimentally;
 means for precluding sensitivity of said transceiver to cross-wind currents present during the descent; and
 means for causing said system of blades to affix said transceiver in the upper extremities of the first tree-like obstacle encountered during its descent.

16. Apparatus for extending the effective range of communication equipment, said apparatus comprising:
 a container;
 means for retarding the descent of said container when dropped from an elevated position to a selected location, said means comprising an even number of rotor assemblies affixed for rotation about a central normally vertical axis of said container, each of said rotor assemblies including a generally conically-shaped hub and a plurality of helically-shaped rotor blades pivotally connected to the conical surface of said hub and equally spaced circumaxially thereabout; and
 communication means including a receiver for accepting radio signals of a first frequency and amplifying said signals, frequency shifting means for translating said signal of said first frequency to a signal of a second frequency, and a transmitter for amplifying said signal of said second frequency and radiating said signal of said second frequency into the atmosphere.

References Cited by the Examiner

UNITED STATES PATENTS

| | | | |
|---|---|---|---|
| 2,717,309 | 9/1955 | Campbell | 325—113 |
| 3,092,770 | 6/1963 | Shoemaker | 325—4 |
| 3,160,879 | 12/1964 | Downing et al. | 325—115 X |

FOREIGN PATENTS

| | | |
|---|---|---|
| 146,516 | 7/1921 | Great Britain. |

References Cited by the Applicant

UNITED STATES PATENTS

| | | |
|---|---|---|
| 2,450,992 | 10/1948 | Sanderson. |
| 2,509,481 | 5/1950 | Crise. |
| 2,526,451 | 10/1950 | Bensen. |
| 2,545,736 | 3/1951 | Isacco. |
| 2,978,211 | 8/1961 | Wannlund et al. |
| 3,016,217 | 1/1962 | Polleys et al. |

FERGUS S. MIDDLETON, *Primary Examiner.*

ALFRED E. CORRIGAN, *Examiner.*